US012111586B2

(12) United States Patent
Shimoda et al.

(10) Patent No.: US 12,111,586 B2
(45) Date of Patent: Oct. 8, 2024

(54) DEVELOPING DEVICE AND IMAGE FORMING APPARATUS

(71) Applicant: FUJIFILM Business Innovation Corp., Tokyo (JP)

(72) Inventors: Masayuki Shimoda, Kanagawa (JP); Masafumi Kudo, Kanagawa (JP)

(73) Assignee: FUJIFILM Business Innovation Corp., Tokyo (JP)

( * ) Notice: Subject to any disclaimer, the term of this patent is extended or adjusted under 35 U.S.C. 154(b) by 15 days.

(21) Appl. No.: 17/988,731

(22) Filed: Nov. 16, 2022

(65) Prior Publication Data

US 2023/0367241 A1 Nov. 16, 2023

(30) Foreign Application Priority Data

May 11, 2022 (JP) ................................ 2022-078080

(51) Int. Cl.
*G03G 15/08* (2006.01)

(52) U.S. Cl.
CPC ....... *G03G 15/0887* (2013.01); *G03G 15/081* (2013.01)

(58) Field of Classification Search
CPC ............. G03G 15/0822; G03G 15/081; G03G 15/0887; G03G 21/206
See application file for complete search history.

(56) References Cited

U.S. PATENT DOCUMENTS

| | | | | |
|---|---|---|---|---|
| 10,088,771 B1 | 10/2018 | Kuramoto | | |
| 2015/0016848 A1* | 1/2015 | Ishii | G03G 15/0887 | 399/279 |
| 2015/0093139 A1* | 4/2015 | Kuramoto | G03G 15/0806 | 399/92 |
| 2019/0294077 A1* | 9/2019 | Kuramoto | G03G 15/0865 | |
| 2020/0096901 A1* | 3/2020 | Noguchi | G03G 15/0896 | |

FOREIGN PATENT DOCUMENTS

| | | |
|---|---|---|
| JP | 2008026487 | 2/2008 |
| JP | 2019002990 | 1/2019 |
| JP | 2020003596 | 1/2020 |

* cited by examiner

*Primary Examiner* — Carla J Therrien
(74) *Attorney, Agent, or Firm* — JCIPRNET

(57) ABSTRACT

A developing device includes: a rotating member that delivers a developer to an image holding body while rotating, and has a minimum distance with a housing at a portion from delivery of the developer to the image holding body to release of the developer as viewed in an axial direction of the rotation; a supply member that extends in the axial direction, is disposed diagonally below the rotating member as viewed from the axial direction, and transports the developer while rotating to supply the developer to the rotating member; and a pair of flow path walls that are disposed above the supply member and sandwich a flow path connecting from an inside to an outside of the housing in an upward-downward direction, the flow path having a first flow path width of an inner flow path opening on an inner side of the housing in the flow path as viewed from the axial direction equal to or larger than the minimum distance, and a second flow path width of an outer flow path opening on an outer side of the housing in the flow path as viewed from the axial direction larger than the first flow path width.

6 Claims, 6 Drawing Sheets

DEVELOPING DEVICE AND IMAGE FORMING APPARATUS

CROSS-REFERENCE TO RELATED APPLICATIONS

This application is based on and claims priority under 35 USC 119 from Japanese Patent Application No. 2022-078080 filed May 11, 2022.

BACKGROUND

(i) Technical Field

The present invention relates to a developing device and an image forming apparatus.

(ii) Related Art

A developing device described in JP2019-002990A includes a developing device main body, a developing sleeve, a transport member, an output flow path for outputting air in the developing device main body, and a shielding portion disposed between an air inlet of the output flow path and the developing sleeve, the shielding portion in which an end portion is disposed at a lower end portion of the developing sleeve or below the lower end portion of the developing sleeve in a gravitational direction, and above a transport member upper end portion in the gravitational direction.

SUMMARY

The developing device includes a rotating member that delivers a developer to an image holding body while rotating, and a supply member that is disposed diagonally below with respect to the rotating member and transports the developer while rotating to supply the developer to the rotating member. Further, above the supply member, a flow path connecting an inside and an outside of a housing of the developing device is formed between a pair of flow path walls.

The developer that is not delivered to the image holding body and remains on the rotating member returns to the supply member side, and is released from the rotating member to the supply member side by a centrifugal force of the rotating member. Here, the released developer collides with the developer transported by the supply member, and cloud toner is generated.

On the other hand, air around the rotating member flows into the inside of the housing from between the rotating member and the housing by the rotating member which is rotating, so that an internal pressure of the housing is increased. As the internal pressure of the housing is increased, the air inside the housing flows out of the housing. The cloud toner is outputted to the outside of the housing along with the air flowing out of the housing.

In the related art, a minimum distance between the rotating member and the housing is larger than a width of an inner flow path opening on an inner side of the housing in the flow path formed between the pair of flow path walls.

Aspects of non-limiting embodiments of the present disclosure relate to a developing device and an image forming apparatus that suppress cloud toner from being outputted to an outside of a housing, as compared with a case where a minimum distance between a rotating member and the housing is larger than a flow path width of an inner flow path opening of a flow path.

Aspects of certain non-limiting embodiments of the present disclosure overcome the above disadvantages and/or other disadvantages not described above. However, aspects of the non-limiting embodiments are not required to overcome the disadvantages described above, and aspects of the non-limiting embodiments of the present disclosure may not overcome any of the disadvantages described above.

According to an aspect of the present disclosure, there is provided a developing device including: a rotating member that delivers a developer to an image holding body while rotating, and has a minimum distance with a housing at a portion from delivery of the developer to the image holding body to release of the developer as viewed in an axial direction of the rotation; a supply member that extends in the axial direction, is disposed diagonally below the rotating member as viewed from the axial direction, and transports the developer while rotating to supply the developer to the rotating member; and a pair of flow path walls that are disposed above the supply member and sandwich a flow path connecting from an inside to an outside of the housing in an upward-downward direction, the flow path having a first flow path width of an inner flow path opening on an inner side of the housing in the flow path as viewed from the axial direction equal to or larger than the minimum distance, and a second flow path width of an outer flow path opening on an outer side of the housing in the flow path as viewed from the axial direction larger than the first flow path width.

BRIEF DESCRIPTION OF THE DRAWINGS

Exemplary embodiment(s) of the present invention will be described in detail based on the following figures, wherein.

DETAILED DESCRIPTION

Examples of an image forming apparatus according to exemplary embodiments of the present invention will be described with reference to FIGS. 1 to 6. An arrow H illustrated in each diagram is a vertical direction and indicates an apparatus upward-downward direction, an arrow W is a horizontal direction and indicates an apparatus width direction, and an arrow D is the horizontal direction and indicates an apparatus depth direction.

Overall Configuration of Image Forming Apparatus 10

Figure 1:
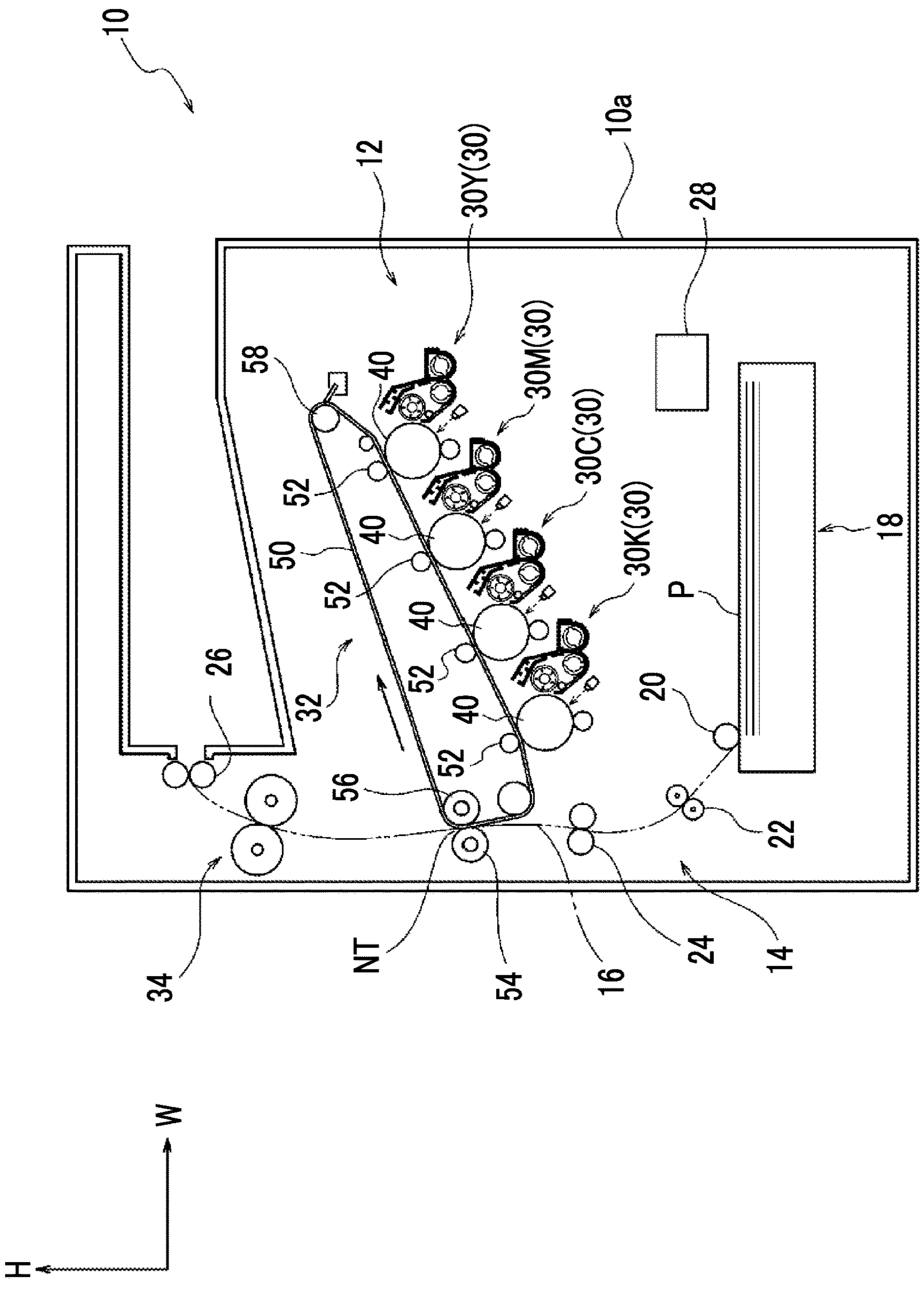
FIG. 1 is a schematic configuration diagram illustrating an image forming apparatus according to an exemplary embodiment of the present disclosure.

As illustrated in FIG. 1, an image forming apparatus 10 includes an image forming portion 12 that forms a toner image by an electrophotographic method, and a transport portion 14 that transports a sheet member P as a recording medium along a transport path 16. Further, the image forming apparatus 10 includes a housing member 18 accommodating the sheet member P and a control portion 28 that controls the entire apparatus.

In the image forming apparatus 10 having the configuration, the sheet member P accommodated in the housing member 18 is transported by the transport portion 14 along the transport path 16. Further, the toner image formed by the image forming portion 12 is formed on the sheet member P to be transported, and the sheet member P on which the toner image is formed is output to an outside of an apparatus main body 10*a*.

Image Forming Portion 12

As illustrated in FIG. 1, the image forming portion 12 includes a plurality of toner image forming portions 30 that form each toner image of each color, and a transfer portion 32 that transfers the toner image formed by the toner image forming portion 30 to the sheet member P. Further, the image forming portion 12 includes a fixing device 34 that fixes the toner image transferred to the sheet member P by the transfer portion 32 to the sheet member P.

Toner Image Forming Portion 30

The plurality of toner image forming portions 30 are provided to form a toner image for each color. The present exemplary embodiment provides toner image forming portions 30Y, 30M, 30C, and 30K having a total of four colors of yellow (Y), magenta (M), cyan (C), and black (K). In the following description, in a case where it is not necessary to distinguish between yellow (Y), magenta (M), cyan (C), and black (K), Y, M, C, and K attached to the reference numerals are omitted.

Figure 2:
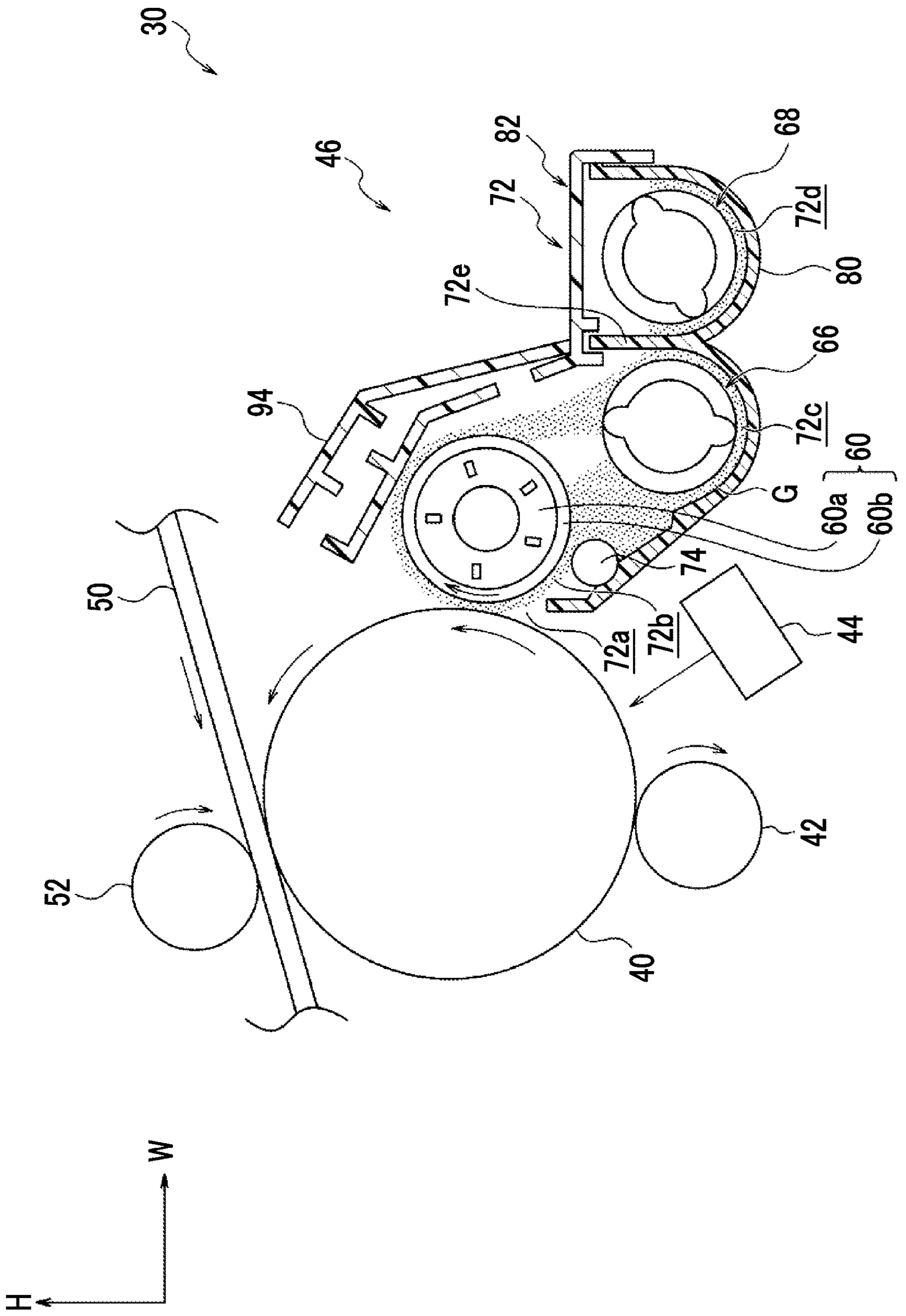
FIG. 2 is a cross-sectional view diagram illustrating a toner image forming portion of the image forming apparatus according to the exemplary embodiment of the present disclosure.

The toner image forming portion 30 of each color is basically configured in the same manner except for a toner to be used, and as illustrated in FIG. 2, a rotating cylindrical image holding body 40 and a charger 42 that charges the image holding body 40. Further, the toner image forming portion 30 includes an exposure device 44 that irradiates the charged image holding body 40 with exposure light to form an electrostatic latent image and a developing device 46 that develops the electrostatic latent image by using a developer G containing a toner as a toner image. Therefore, the toner image forming portion 30 of each color forms an image of each color by using the toner of each color. Details of the developing device 46 will be described below.

Further, as illustrated in FIG. 1, the image holding body 40 of each color is in contact with a transfer belt 50 (details will be described below) that moves around. In a circumference direction of the transfer belt 50 (see the arrow in FIG. 1), the toner image forming portions 30 of yellow (Y), magenta (M), cyan (C), and black (K) are arranged side by side in this order from the upstream side.

Transfer Portion 32

As illustrated in FIG. 1, the transfer portion 32 includes the transfer belt 50 and primary transfer rolls 52 that are respectively disposed on an opposite side of the image holding body 40 of each color with the transfer belt 50 interposed therebetween and transfer a toner image formed on the image holding body 40 of each color to the transfer belt 50.

Further, the transfer portion 32 includes a winding roll 56 around which the transfer belt 50 is wound, and a drive roll 58 around which the transfer belt 50 is wound and which transmits the rotational force to the transfer belt 50. Therefore, the transfer belt 50 orbits in an arrow direction in FIG. 1.

Further, the transfer portion 32 is disposed on an opposite side of the winding roll 56 with the transfer belt 50 interposed therebetween, and includes a secondary transfer roll 54 that transfers the toner image transferred to the transfer belt 50 to the sheet member P. The transfer nip NT that transfers the toner image to the sheet member P is formed between the secondary transfer roll 54 and the transfer belt 50.

In this configuration, the toner image is primarily transferred to the transfer belt 50 by the primary transfer roll 52 in order of yellow (Y), magenta (M) , cyan (C), and black (K). In addition, the toner image is transferred from the transfer belt 50 to the sheet member P interposed and transported between the transfer belt 50 and the secondary transfer roll 54 by the secondary transfer roll 54. Further, the sheet member P to which the toner image is transferred is transported toward the fixing device 34.

Fixing Device 34

As illustrated in FIG. 1, the fixing device 34 is disposed on a downstream side of a transfer nip NT in a transport direction of the sheet member P. The fixing device 34 heats and pressurizes a toner image transferred to the sheet member P to fix the toner image to the sheet member P.

Transport Portion 14

As illustrated in FIG. 1, the transport portion 14 includes a sending roll 20 that sends the sheet member P accommodated in the housing member 18 to the transport path 16 and a prevention roll 22 that prevents over-feeding of the sheet member P to be sent out by the sending roll 20. Further, the transport portion 14 includes an adjustment roll 24 that adjusts a timing of the sheet member P to be sent to the transfer nip NT, and an output roll 26 that outputs the sheet member P on which a toner image is fixed by the fixing device 34 to the outside of the apparatus main body 10*a*.

Central Portion Configuration

Next, the developing device 46 will be described.

As illustrated in FIG. 2, the developing device 46 includes a housing 72, a developing roll 60 disposed to face the image holding body 40, a supply auger 66 for supplying a developer G to the developing roll 60, and an agitating auger 68 for agitating the developer G. The developing roll 60 is an example of a rotating member, and the supply auger 66 is an example of a supply member.

The developer G is a two-component developer G including toner T and magnetic carrier particles (hereinafter, referred to as "carrier C") as main components.

Housing 72

As illustrated in FIG. 2, the housing 72 is disposed next to the image holding body 40, and an opening portion 72*a* that opens an inside of the housing 72 is formed to extend in the apparatus depth direction at a portion of the housing 72 facing the image holding body 40.

Further, the housing 72 is configured to include a base portion 80 constituting a lower portion of the housing 72, a top portion 82 covering the base portion 80 from above, and a cover portion 94 covering a portion of the top portion 82 on the image holding body 40 side from an upper portion.

In addition, in the housing 72, a delivery path 72*b* in which the developing roll 60 is disposed is formed to extend in the apparatus depth direction, on an opposite side of the image holding body 40 with the opening portion 72*a* interposed therebetween. Further, in the housing 72, a supply path 72*c* in which the supply auger 66 is disposed is formed to extend diagonally below the delivery path 72*b* in the apparatus depth direction. In addition, in the housing 72, an agitating path 72*d* in which the agitating auger 68 is disposed is formed on an opposite side of the delivery path 72*b* with the supply path 72*c* interposed therebetween so as to extend in the apparatus depth direction. Further, in the housing 72, a partition wall 72*e* that separates the supply path 72*c* and the agitating path 72*d* is formed between the supply path 72*c* and the agitating path 72*d*.

Figure 3:
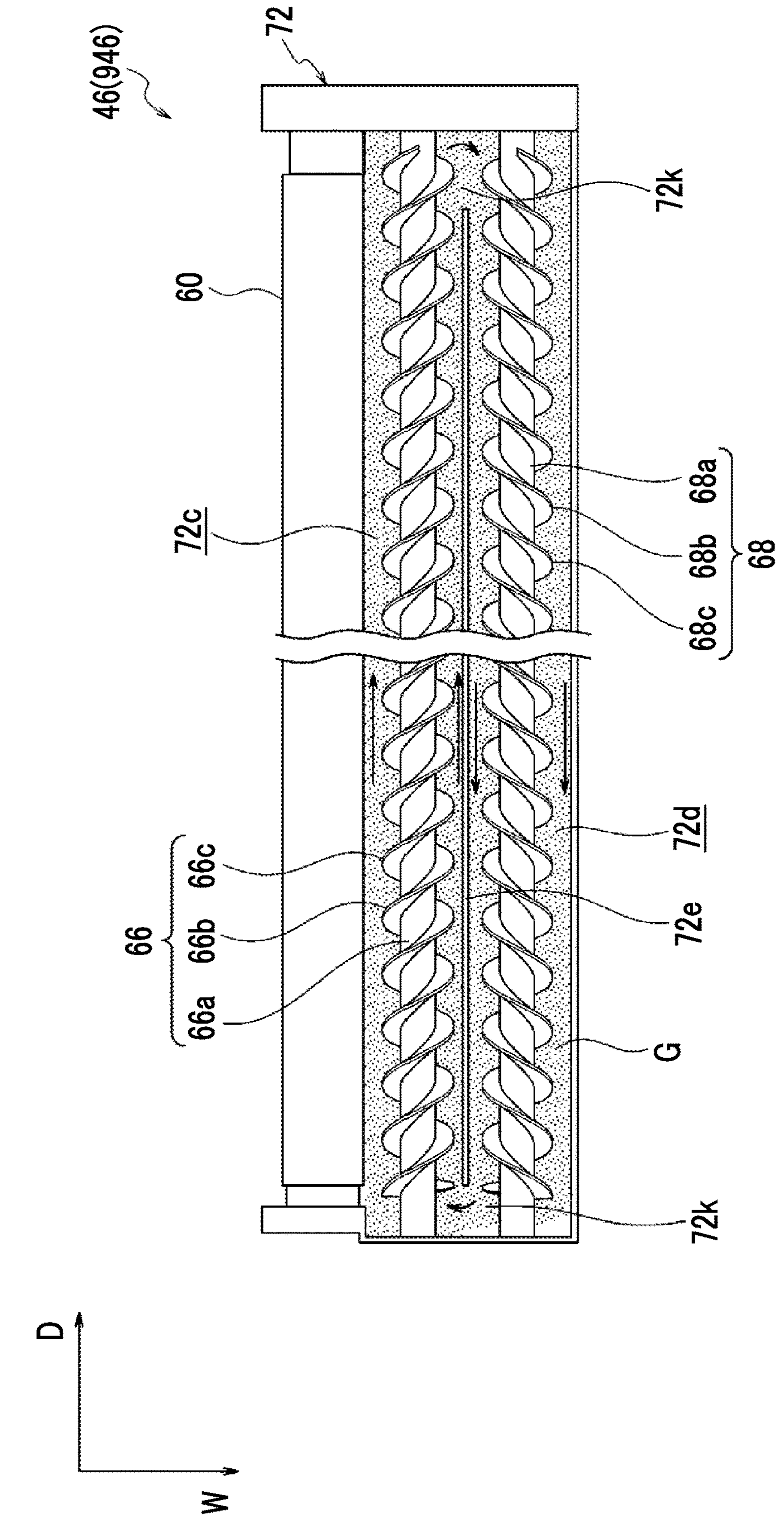
FIG. 3 is a plan view illustrating a flow and the like of a developer of a developing device according to the exemplary embodiment of the present disclosure.

As illustrated in FIG. 2, the supply path 72*c* and the agitating path 72*d* have a U-shaped cross-section shape. Further, the partition wall 72*e* obliquely extends upward and downward, and as illustrated in FIG. 3, the supply path 72*c* and the agitating path 72*d* are separated from each other except for a portion of the supply path 72*c* on the depth side in the apparatus depth direction and a portion of the supply path 72*c* on the front side in the apparatus depth direction.

In addition, as illustrated in FIG. 2, a layer thickness regulating roll 74 for regulating a layer thickness of the developer G is disposed at a lower portion of the delivery path 72*b*.

Details of a configuration of the top portion 82 and the cover portion 94 of the housing will be described below.

Developing Roll 60

The developing roll 60 is disposed in the delivery path 72*b* as illustrated in FIG. 2 with an axial direction as the apparatus depth direction. In this manner, in the present exemplary embodiment, an axial direction of the developing roll 60 and the apparatus depth direction are the same direction.

Further, a gap (development gap) for delivering the developer G from the developing roll 60 to the image holding body 40 is formed between the developing roll 60 and the image holding body 40.

The developing roll 60 includes a magnet roll 60*a* having a circular cross-section shape and a rotary sleeve 60*b* that is placed on the magnet roll 60*a* and rotates around the magnet roll 60*a*. A rotational force is transmitted from a driving source (not illustrated), so that the rotary sleeve 60*b* rotates in a clockwise direction.

Figure 4:
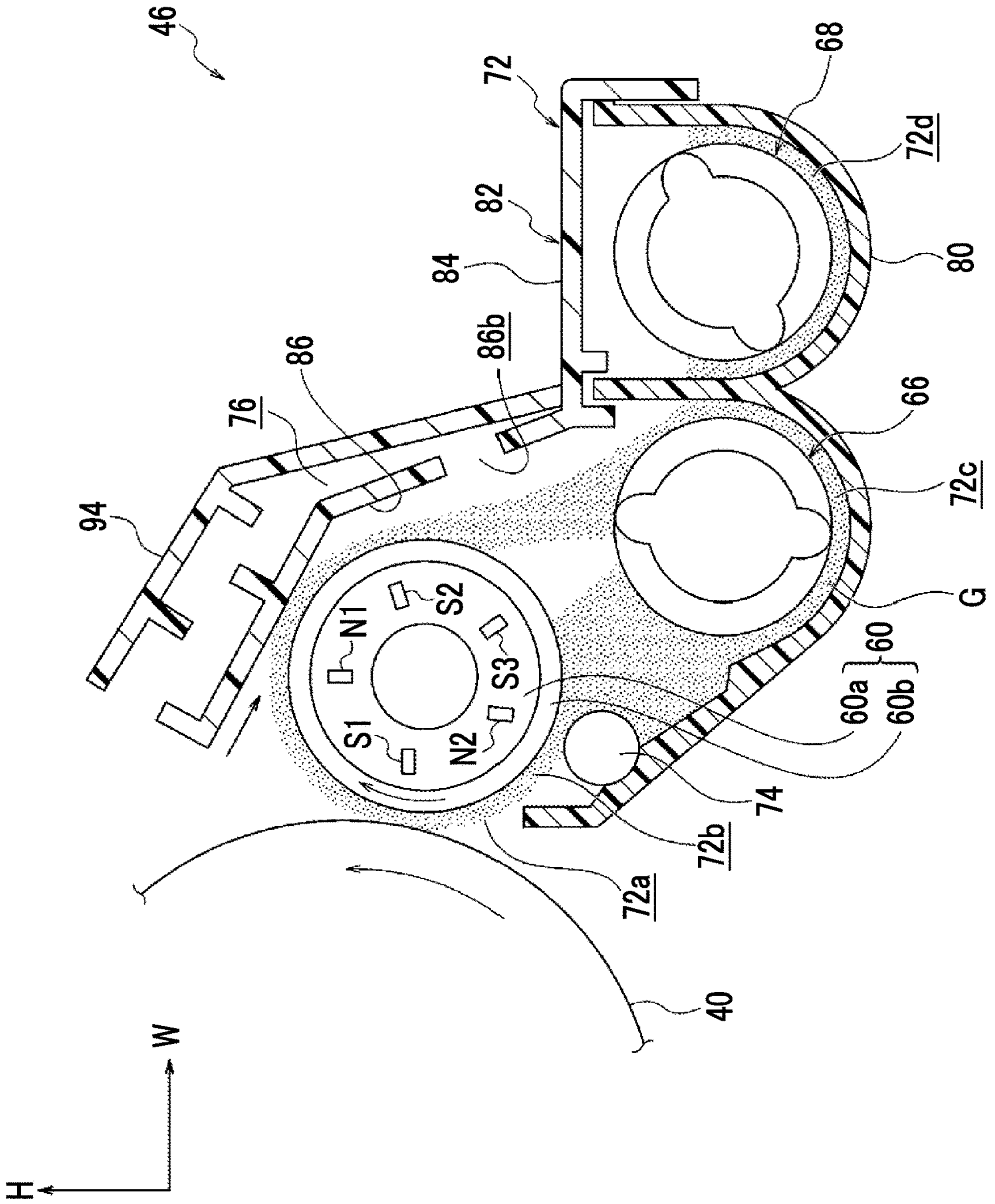
FIG. 4 is a cross-sectional view illustrating the developing device according to the exemplary embodiment of the present disclosure.

In addition, as illustrated in FIG. 4, the magnet roll 60*a* has a total of five magnetic poles of poles N1 and N2 of N polarity and poles S1, S2, and S3 of S polarity, and the five magnetic poles are arranged at intervals determined in order of S1, N1, S2, S3, and N2 in a circumferential direction.

Specifically, the developing pole S1 is disposed at a position facing the image holding body 40, and the regulating pole N2 for regulating the layer thickness of the developer G is disposed on an upstream side of the developing pole S1 in a rotation direction of the developing roll 60.

Further, the peeling pole S2 and the pumping pole S3 are disposed on a downstream side of the developing pole S1 and an upstream side of the regulating pole N2, and the transport pole N1 is disposed between the developing pole S1 and the peeling pole S2.

With this configuration, the developer G stuck on a surface of the rotary sleeve 60*b* in the vicinity of the pumping pole S3 is transported to the regulating pole N2→the developing pole S1→the transport pole N1. When passing through the regulating pole N2, a layer thickness of the developer G is made uniform by the layer thickness regulating roll 74, the non-magnetic toner T on a magnetic brush is delivered to the image holding body 40 in the vicinity of the developing pole S1, and the magnetic brush, which is almost only a magnetic carrier, remains on the surface of the rotary sleeve 60*b*. As the rotary sleeve 60*b* rotates, the magnetic brush, which is only the magnetic carrier, is released from the surface of the rotary sleeve 60*b* at the peeling pole S2 and released to the supply auger 66 side.

Supply Auger 66

As illustrated in FIG. 4, the supply auger 66 is disposed at the supply path 72*c* with an axial direction as the apparatus depth direction. As illustrated in FIG. 3, the supply auger 66 is configured to include a supply shaft 66*a* extending in the apparatus depth direction, and two spiral supply blades 66*b* and 66*c* formed on an outer peripheral surface of the supply shaft 66*a*.

Both end portions of the supply shaft 66*a* are rotatably supported by the wall portion of the housing 72, and a gear (not illustrated) to which the rotational force is transmitted from the driving source is fixed to one end portion of the supply shaft 66*a*.

In this configuration, the rotating supply auger 66 agitates the developer G in the supply path 72*c* and transports the developer G from the front side (left side in FIG. 3) in the apparatus depth direction to the depth side (right side in FIG. 3) in the apparatus depth direction to supply the developer G to the developing roll 60. Further, the rotating supply auger 66 delivers the developer G to the agitating auger 68 through the communication passage 72*k* on the depth side in the apparatus depth direction.

Agitating Auger 68

The agitating auger 68 is disposed at the agitating path 72*d*, as illustrated in FIG. 4 with an axial direction as the apparatus depth direction. As illustrated in FIG. 3, the agitating auger 68 is configured to include an agitating shaft 68*a* extending in the apparatus depth direction and two spiral agitating blades 68*b* and 68*c* formed on an outer peripheral surface of the agitating shaft 68*a*.

Both end portions of the agitating shaft 68*a* are rotatably supported by the wall portion of the housing 72, and a gear (not illustrated) to which the rotational force is transmitted from the driving source is fixed to one end portion of the agitating shaft 68*a*.

In this configuration, the rotating supply auger 66 and the rotating agitating auger 68 transports the developer G, and the developer G circulates between the supply path 72*c* and the agitating path 72*d* (see arrow in FIG. 3).

Top Portion 82 and Cover Portion 94 of Housing 72

The top portion 82 covers the developing roll 60, the supply auger 66, and the agitating auger 68 from above, as illustrated in FIG. 4. Specifically, the top portion 82 has a plate shape, and one portion 84 covering the agitating auger 68 in the top portion 82 extends in the apparatus width direction. Further, the other portion 86 covering the developing roll 60 and the supply auger 66 in the top portion 82 is tilted such that a side close to the image holding body 40 is upward with respect to a side away from the image holding body 40. A through-hole 86*b* penetrating from the front and back is formed extending in the apparatus depth direction in a portion of the other portion 86, which is separated from the image holding body 40.

The cover portion 94 covers the other portion 86 of the top portion 82 from above. The cover portion 94 has a plate shape, and an end portion of the cover portion 94 on a side away from the image holding body 40 abuts against the one portion 84 of the top portion 82. In addition, an end portion of the cover portion 94 on a side close to the image holding body 40 is separated from the end portion of the other portion 86 of the top portion 82.

Figure 5:
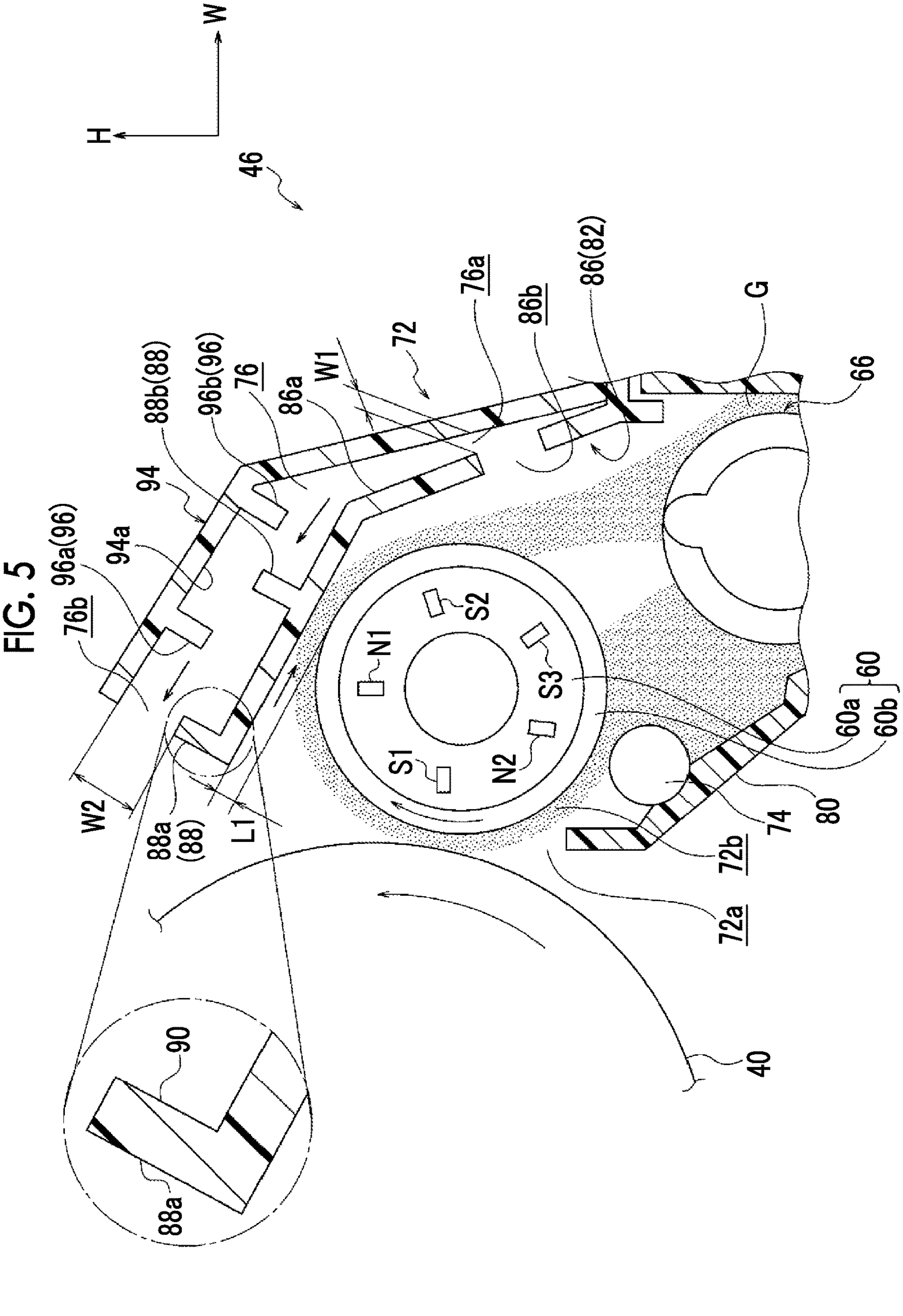
FIG. 5 is an enlarged cross-sectional view illustrating the developing device according to the exemplary embodiment of the present disclosure.

As illustrated in FIG. 5, a region sandwiched between a portion of the other portion 86 of the top portion 82 on a side of the image holding body 40 with respect to the through-hole 86*b* and the cover portion 94 is a flow path 76 formed to connect from an inside to an outside of the housing 72. In other words, the flow path 76 is sandwiched in an upward-downward direction between a flow path wall 86*a* facing the flow path 76 at the other portion 86 of the top portion 82 and a flow path wall 94*a* facing the flow path 76 at the cover portion 94. The flow path wall 86*a* is an example of one flow path wall, and the flow path wall 94*a* is an example of the other flow path wall.

As viewed from the apparatus depth direction, a minimum distance with the housing 72 at a portion of the developing roll 60 from delivery of the developer G to the image holding body 40 to release of the developer G is set to L1 (see FIG. 5), and a flow path width of an inner flow path opening 76*a* on an inner side of the housing 72 in the flow path 76 is set to W1. Further, in the flow path 76, a flow path width of an outer flow path opening 76*b* on an outer side of the housing 72 is set to W2 (see FIG. 5). Accordingly, in the present exemplary embodiment, the flow path width W1 is set to be equal to or larger than the distance L1, and the flow path width W2 is larger than the flow path width W1. Here, the inner flow path opening 76*a* is a portion at which the flow path width is the narrowest.

Further, the flow path wall 86*a* is configured to include a projecting portion 88 projecting toward the flow path wall 94*a*. The two projecting portions 88 are provided in a plate shape, a projecting portion 88*a* is provided at the outer flow path opening 76*b*, and a projecting portion 88*b* is provided at the inner flow path opening 76*a* side with respect to the projecting portion 88*a*.

In addition, an upper end of a flat surface 90 facing a flow path side of the projecting portion 88*a* is disposed on the flow path 76 side in the horizontal direction with respect to a lower end of the flat surface 90. That is, the flat surface 90 is tilted toward the flow path 76 side. Further, a distance from a tip of the projecting portion 88*b* to the flow path wall 94*a* is larger than the flow path width W1, and smaller than the flow path width W2.

On the other hand, the flow path wall 94*a* is configured to include a projecting portion 96 projecting toward the flow path wall 86*a*. The projecting portion 96 is an example of another projecting portion.

The two projecting portions 96 are provided in a plate shape, and a projecting portion 96*a* is provided between the projecting portions 88*b* and 88*a* from the inner flow path opening 76*a* toward the outer flow path opening 76*b*. Further, the projecting portion 96*b* is provided on a front side of the projecting portion 88*b* from the inner flow path opening 76*a* toward the outer flow path opening 76*b*. In this manner, as viewed from the apparatus depth direction, the projecting portions 88 and the projecting portions 96 are displaced in a direction from the inner flow path opening 76*a* toward the outer flow path opening 76*b*, and are alternately disposed.

Further, a distance from tips of the projecting portions 96*a* and 96*b* to the flow path wall 86*a* is larger than the flow path width W1, and smaller than the flow path width W2.

Action of Central Portion Configuration

Next, an action of the developing device 46 will be described. The action of the developing device 46 will be described in comparison with a developing device 946 according to a comparative exemplary embodiment.

Figure 6:
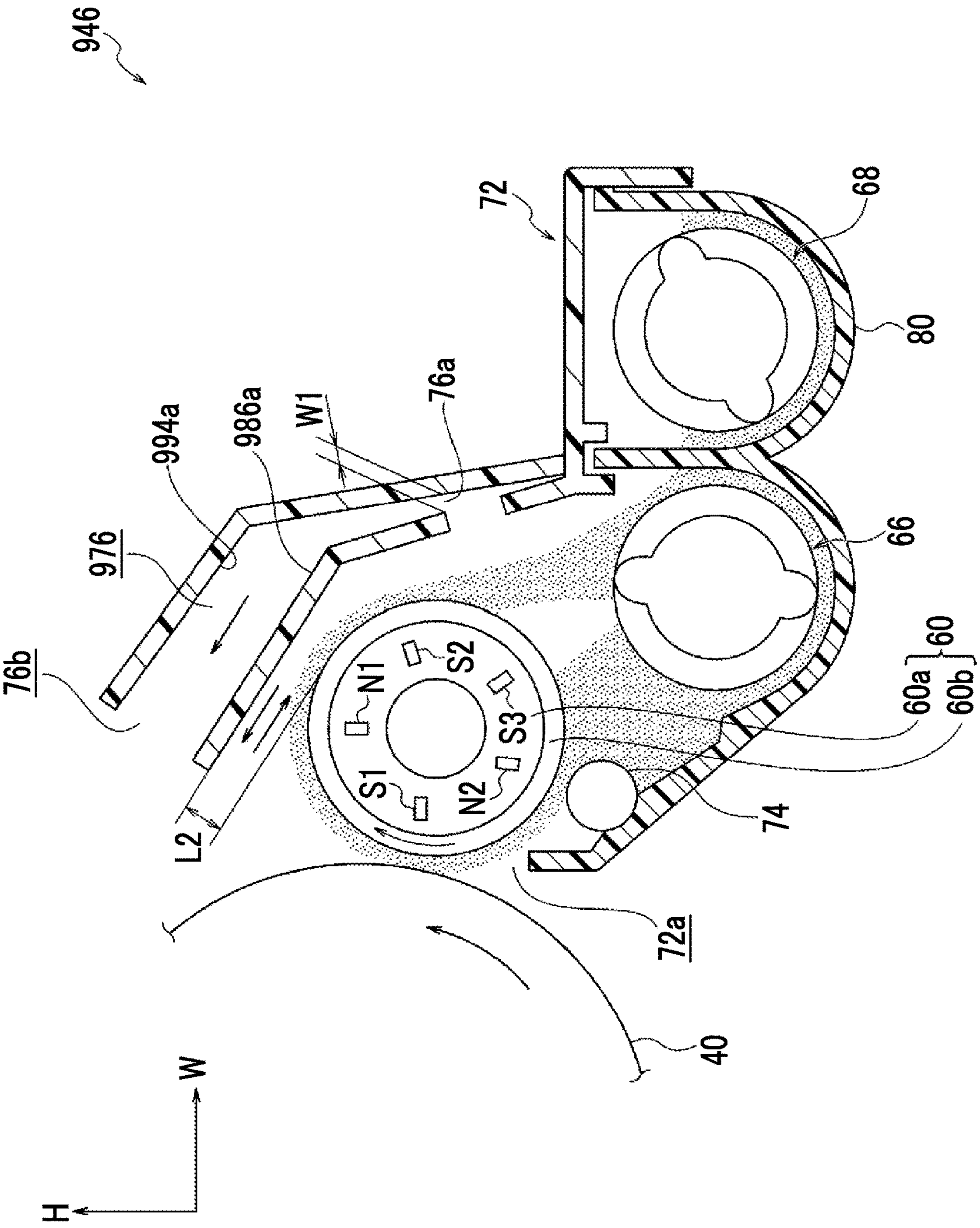
FIG. 6 is a cross-sectional view illustrating a developing device according to a comparative exemplary embodiment with respect to the exemplary embodiment of the present disclosure.

Unlike the developing device 46, the developing device 946 has a minimum distance L2 between the developing roll 60 and the housing 72, which is larger than the flow path width W1 of the inner flow path opening 76*a*, as illustrated in FIG. 6. Further, no projecting portion is provided at flow path walls 986*a* and 994*a* of the developing device 946. Other configurations of the developing device 946 have the same manner as the configurations of the developing device 46.

Inside the housing 72 of the developing devices 46 and 946, the rotating supply auger 66 and agitating auger 68 circulate between the supply path 72*c* and the agitating path 72*d* while agitating the developer G, as illustrated in FIG. 3 (see arrow in FIG. 3). By the developer G being agitated, the toner T and the carrier C in the developer G rub against each other, and the toner T is triboelectrically charged to a predetermined polarity.

As illustrated in FIGS. 4 and 6, with the rotation of the developing roll 60, air around the developing roll 60 flows from between the developing roll 60 and the housing 72 into the inside of the housing 72. As the air flows into the housing 72, an internal pressure of the housing 72 is increased.

On the other hand, the rotating supply auger 66 supplies the developer G to the rotating developing roll 60. The developer G supplied to the developing roll 60 is held in a state in which a magnetic brush (not illustrated) is formed on a surface of the developing roll 60 by a magnetic force of the magnet roll 60*a*. The rotating rotary sleeve 60*b* transports the developer G.

The rotating rotary sleeve 60*b* transports the developer G to a position facing the image holding body 40. The toner T included in the developer G transported to the position facing the image holding body 40 adheres to an electrostatic latent image formed on the image holding body 40, and the electrostatic latent image is visualized as a toner image. Further, the developer G, which passes through the position facing the image holding body 40 and of which proportion of the toner T is decreased, is transported by the rotating rotary sleeve 60*b*, and passes between the developing roll 60 and the housing 72. The transported developer G is released from the developing roll 60 and scatters toward the supply auger 66 side by the centrifugal force of the rotary sleeve 60*b*, at a portion facing the peeling pole S2.

The developer G released from the developing roll 60 collides with the developer G being transported by the supply auger 66 to generate cloud toner.

As described above, the internal pressure of housing 72 is increased. Therefore, the cloud toner is outputted to the outside of the housing 72 along with air flowing out of the housing 72.

In the developing device 946 according to the comparative exemplary embodiment, as illustrated in FIG. 6, the minimum distance L2 between the developing roll 60 and the housing 72 is set to be larger than the flow path width W1 of the inner flow path opening 76*a*. Therefore, air inside the housing 72 flows out from between the developing roll 60 and the housing 72, and from a flow path 976. In other words, a flow of the air is two-way between the developing roll 60 and the housing 72. The cloud toner generated inside the housing 72 is outputted to the outside of the housing 72 along with the air flowing out of the housing 72.

Specifically, with the developing device 946, the cloud toner flows between the developing roll 60 and the housing 72, and from the flow path 976 toward the outside of the housing 72. A part of the cloud toner flowing outward from the flow path 976 sinks in the flow path 976, and the other part which does not sink is outputted to the outside of the housing 72. The cloud toner flowing outward from between the developing roll 60 and the housing 72 is outputted to the outside of the housing 72, without sinking under the influence of the air flowing inward from between the developing roll 60 and the housing 72.

On the other hand, with the developing device 46 according to the present exemplary embodiment, as illustrated in FIG. 5, the flow path width W1 is set to be equal to or larger than the distance L1, and the flow path width W2 is larger than the flow path width W1. Therefore, the air flowing from between the developing roll 60 and the housing 72 flows into the flow path 76 from the inner flow path opening 76*a*, flows through the flow path 76, and flows out of the housing 72 from the outer flow path opening 76*b*.

That is, the flow of the air becomes one-way. The cloud toner generated inside the housing 72 flows through the flow path 76 along with the air flowing out of the housing 72, and is outputted to the outside of the housing 72. Specifically, the cloud toner flows through the flow path 76 provided with the projecting portions 88 and 96, and is outputted to the outside of the housing 72.

Summary

As described above, unlike the developing device 946, with the developing device 46, the air flowing from between the developing roll 60 and the housing 72 flows into the flow path 76 from the inner flow path opening 76*a*, flows through the flow path 76, and flows out of the housing 72 from the outer flow path opening 76*b*. That is, the flow of the air becomes one-way.

Therefore, unlike the developing device 946, with the developing device 46, cloud toner is suppressed from being outputted from between the developing roll 60 and the housing 72, and most of the cloud toner flows outward from the flow path 76. A part of the cloud toner flowing outward from the flow path 76 sinks in the flow path 76, and the other part which does not sink is outputted to the outside of the housing 72.

Here, unlike the developing device 946, the developing device 46 has a one-way air flow. Therefore, the amount of cloud toner directed to the outside from the flow path 76 is larger than the amount of cloud toner directed to the outside from the flow path 976 of the developing device 946. Therefore, the amount of cloud toner that sinks in the flow path 76 also is increased. In other words, the amount of cloud toner outputted to the outside of the housing 72 is reduced, as compared with the configuration of the developing device 946.

As described above, with the developing device 46, the cloud toner is suppressed from being outputted to the outside of the housing 72, as compared with the developing device 946.

Further, unlike the developing device 946, with the developing device 46, the flow path wall 86*a* is configured to include the projecting portion 88 projecting toward the flow path wall 94*a*, and the flow path wall 94*a* is configured to include the projecting portion 96 projecting toward the flow path wall 86*a*. As a result, a length of the flow path 76 through which the cloud toner flows becomes longer than in a case where the flow path wall is planar. Therefore, the amount of cloud toner that sinks in the flow path 76 is increased. That is, with the developing device 46, the cloud toner is suppressed from being outputted to the outside of the housing 72, as compared with a case where both flow path walls are planar.

Further, with the developing device 46, the projecting portion 88 and the projecting portion 96 are displaced in a direction from the inner flow path opening 76*a* toward the outer flow path opening 76*b*. As a result, the length of the flow path 76 through which the cloud toner flows is reduced is increased, as compared with a case where the projecting portion 88 and the projecting portion 96 are disposed at the same positions in the direction from the inner flow path opening 76*a* to the outer flow path opening 76*b*. Therefore, the amount of cloud toner that sinks in the flow path 76 is increased. That is, with the developing device 46, the cloud toner is suppressed from being outputted to the outside of the housing 72 than in a case where the projecting portion 88 and the projecting portion 96 are disposed at the same positions in the direction from the inner flow path opening 76*a* to the outer flow path opening 76*b*.

With the developing device 46, the projecting portions 88 and the projecting portions 96 are alternately disposed from the inner flow path opening 76*a* toward the outer flow path opening 76*b*. As a result, as compared with a case where the two projecting portions 96 are provided between a pair of projecting portions 88 from the inner flow path opening 76*a* toward the outer flow path opening 76*b*, the flow path 76 becomes a zigzag shape and the length of the flow path 76 through which the cloud toner flows becomes longer. Therefore, the amount of cloud toner that sinks in the flow path 76 is increased. In other words, with the developing device 46, the cloud toner is suppressed from being outputted to the outside of the housing 72, as compared with a case where the two projecting portions 96 are provided between the pair of projecting portions 88 from the inner flow path opening 76*a* toward the outer flow path opening 76*b*.

Further, with the developing device 46, the projecting portion 88*a* forming the flow path wall 86*a* is provided at the outer flow path opening 76*b*. Therefore, the cloud toner outputted to the outside can be blocked, as compared with a case where a portion forming the outer flow path opening 76*b* in the flow path wall 86*a* is planar. Therefore, the cloud toner is suppressed from being outputted to the outside of the housing 72.

With the developing device 46, the flat surface 90 facing the flow path 76 side is formed on the projecting portion 88*a*, and the upper end of the flat surface 90 is disposed on the flow path 76 side in the horizontal direction with respect to the lower end of the flat surface 90. As a result, the cloud toner is suppressed from getting over the projecting portion, as compared with a case where the lower end of the flat surface is disposed on the flow path side in the horizontal direction with respect to the upper end of the flat surface. Therefore, the cloud toner is suppressed from being outputted to the outside of the housing 72.

Further, in the image forming apparatus 10, the inside of the apparatus main body 10*a* is suppressed from being soiled with the cloud toner, as compared with a case where the developing device 946 is provided.

Although the specific exemplary embodiments of the present disclosure are described in detail, the exemplary embodiment of the present disclosure is not limited to such exemplary embodiments, and it is apparent to those skilled in the art that various other exemplary embodiments can be taken within the scope of the present disclosure. For example, in the exemplary embodiment described above, the flow path wall 86*a* is configured to include the projecting portion 88, and the flow path wall 94*a* is configured to include the projecting portion 96, and the flow path wall may be planar. In this case, the action caused by having the projecting portion does not occur.

In addition, in the exemplary embodiment described above, the projecting portions 88 and 96 are plate-shaped, and may not be plate-shaped. For example, the projecting portions 88 and 96 may be triangular or semicircular. In this case, the action of having the flat surface 90 does not work.

Further, in the exemplary embodiment described above, the projecting portions are formed on both the flow path wall 86*a* and the flow path wall 94*a*, and the projecting portion may be formed on either one. In this case, the action caused by the formation of the projecting portions on both the flow path wall 86*a* and the flow path wall 94*a* does not occur.

In addition, in the exemplary embodiment described above, the projecting portions 88 and the projecting portions 96 are disposed alternately from the inner flow path opening 76*a* toward the outer flow path opening 76*b*, and may not be alternately disposed. In this case, the action of being alternately disposed does not work.

Further, in the exemplary embodiment described above, the projecting portion 88*a* is provided at a portion forming the outer flow path opening 76*b* in the flow path wall 86*a*, and may not be provided in the portion forming the outer flow path opening 76*b*. In this case, the action of providing the projecting portion 88*a* at the portion forming the outer flow path opening 76*b* of the flow path wall 86*a* does not work.

(((1)))

A developing device including:

a rotating member that delivers a developer to an image holding body while rotating, and has a minimum distance L1 with a housing at a portion from delivery of the developer to the image holding body to release of the developer as viewed in an axial direction of the rotation;

a supply member that extends in the axial direction, is disposed diagonally below the rotating member as viewed from the axial direction, and transports the developer while rotating to supply the developer to the rotating member; and a pair of flow path walls that are disposed above the supply member and sandwich a flow path connecting from an inside to an outside of the housing in an upward-downward direction, the flow path having a flow path width W1 of an inner flow path opening on an inner side of the housing in the flow path as viewed from the axial direction equal to or larger than the distance L1, and a flow path width W2 of an outer flow path opening on an outer side of the housing in the flow path as viewed from the axial direction larger than the flow path width W1.

(((2)))

The developing device according to (((1))), in which as viewed from the axial direction, one of the flow path walls is configured to include a projecting portion projecting toward the other of the flow path walls.

(((3)))

The developing device according to (((2))), in which as viewed from the axial direction, the other of the flow path walls forming the flow path is configured to include another projecting portion projecting toward the one of the flow path walls, and the projecting portion and the other projecting portion are displaced in a direction from the inner flow path opening toward the outer flow path opening.

(((4)))

The developing device according to (((3))), in which as viewed from the axial direction, the projecting portions and the other projecting portions are alternately provided from the inner flow path opening toward the outer flow path opening, (((5)))

The developing device according to any one of (((2))) to (((4))), in which a lower surface of the flow path is configured with the one of the flow path walls, and at least one of the projecting portions is provided at a portion of the one of the flow path walls forming the outer flow path opening.

(((6)))

The developing device according to (((5))), in which a flat surface facing a flow path side is formed on the projecting portion provided at the portion forming the outer flow path opening, and as viewed from the axial direction, an upper end of the flat surface is disposed on the flow path side in a horizontal direction with respect to a lower end of the flat surface.

The foregoing description of the exemplary embodiments of the present invention has been provided for the purposes of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. A developing device comprising:

a rotating member that delivers a developer to an image holding body while rotating, and has a minimum distance with a housing at a portion from delivery of the developer to the image holding body to release of the developer as viewed in an axial direction of the rotation;

a supply member that extends in the axial direction, is disposed diagonally below the rotating member as viewed from the axial direction, and transports the developer while rotating to supply the developer to the rotating member; and a pair of flow path walls that are disposed above the supply member and sandwich a flow path connecting from an inside to an outside of the housing in an upward-downward direction, the flow path having a first flow path width of an inner flow path opening on an inner side of the housing in the flow path as viewed from the axial direction equal to or larger than the minimum distance, and a second flow path width of an outer flow path opening on an outer side of the housing in the flow path as viewed from the axial direction larger than the first flow path width, wherein the inner flow path opening is a portion at which a distance between the pair of flow path walls is narrowest in the flow path such that the first flow path width is a narrowest width of the flow path, wherein as viewed from the axial direction, one of the flow path walls is configured to include a projecting portion projecting toward the other of the flow path walls, wherein a lower surface of the flow path is configured with the one of the flow path walls, and the projecting portion is provided at a portion of the one of the flow path walls forming the outer flow path opening, wherein a flat surface facing a flow path side is formed on the projecting portion provided at the portion forming the outer flow path opening, and as viewed from the axial direction, an upper end of the flat surface is disposed on the flow path side in a horizontal direction with respect to a lower end of the flat surface.

2. The developing device according to claim 1, wherein as viewed from the axial direction, the other of the flow path walls forming the flow path is configured to include an other projecting portion projecting toward the one of the flow path walls, and the projecting portion and the other projecting portion are displaced in a direction from the inner flow path opening toward the outer flow path opening.

3. The developing device according to claim 2, wherein as viewed from the axial direction, the projecting portion and the other projecting portion are alternately provided from the inner flow path opening toward the outer flow path opening.

4. An image forming apparatus comprising:

an image holding body;

the developing device according to claim 3 that develops a latent image formed on the image holding body as a toner image; and a transfer device that transfers the toner image to a recording medium.

5. An image forming apparatus comprising:

an image holding body;

the developing device according to claim 2 that develops a latent image formed on the image holding body as a toner image; and a transfer device that transfers the toner image to a recording medium.

6. An image forming apparatus comprising:

an image holding body;

the developing device according to claim 1 that develops a latent image formed on the image holding body as a toner image; and a transfer device that transfers the toner image to a recording medium.

* * * * *